United States Patent
Sui et al.

(10) Patent No.: US 11,360,804 B2
(45) Date of Patent: Jun. 14, 2022

(54) RESOURCE MANAGEMENT FOR PARENT CHILD WORKLOAD

(71) Applicant: International Business Machines Corporation, Armonk, NY (US)

(72) Inventors: Guang Han Sui, Beijing (CN); Wei Ge, Beijing (CN); Xing Fang, Beijing (CN); Jinming Lv, Xian (CN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 16/024,238

(22) Filed: Jun. 29, 2018

(65) Prior Publication Data
US 2020/0004580 A1 Jan. 2, 2020

(51) Int. Cl.
*G06F 9/48* (2006.01)
*G06F 9/50* (2006.01)

(52) U.S. Cl.
CPC .......... *G06F 9/4818* (2013.01); *G06F 9/5011* (2013.01); *G06F 9/5083* (2013.01)

(58) Field of Classification Search
CPC .... G06F 9/4818; G06F 9/4881; G06F 9/5005; G06F 9/5011; G06F 9/5083; G06F 2209/484
See application file for complete search history.

(56) References Cited

U.S. PATENT DOCUMENTS

| | | | |
|---|---|---|---|
| 7,406,432 B1 | 7/2008 | Motoyama | |
| 7,451,445 B1 | 11/2008 | Eppstein | |
| 7,913,259 B2 | 3/2011 | Schmitt | |
| 8,024,275 B2* | 9/2011 | Stone | G06Q 30/0283 705/301 |
| 8,806,490 B1 | 8/2014 | Pulsipher | |
| 9,417,918 B2 | 8/2016 | Chin et al. | |
| 9,658,887 B2 | 5/2017 | Chin et al. | |
| 10,248,321 B1* | 4/2019 | Karppanen | G06F 9/4818 |
| 2002/0023117 A1* | 2/2002 | Bernardin | G06F 9/465 718/104 |
| 2005/0183086 A1* | 8/2005 | Abe | G06F 9/4881 718/100 |
| 2006/0112388 A1* | 5/2006 | Taniguchi | G06F 9/5038 718/100 |

(Continued)

OTHER PUBLICATIONS

L. Singh, et al., "A Survey of Workflow Scheduling Algorithms and Research Issues", International Journal of Computer Applications, vol. 74 No. 15, Jul. 2013, pp. 1-8.

(Continued)

*Primary Examiner* — Meng Ai T An
*Assistant Examiner* — Willy W Huaracha
(74) *Attorney, Agent, or Firm* — Kunzler Bean & Adamson (57) ABSTRACT

For resource management for a parent child workload, a processor organizes a plurality of processes into a plurality of process groups. Each process group includes a given parent process and all child processes of the given parent process. Each process group has a process level. The processor further calculates a process cost for each process group and assigns a process priority to each process group based on the process cost for the process group. The processor iteratively assigns computing resources to subgroups of a given process group with a highest process priority at a given process level.

9 Claims, 7 Drawing Sheets

(56) References Cited

U.S. PATENT DOCUMENTS

| | | | |
|---|---|---|---|
| 2007/0081554 A1* | 4/2007 | Saffre | H04L 47/826 370/468 |
| 2008/0059968 A1* | 3/2008 | Cascaval | G06F 1/206 718/103 |
| 2009/0228889 A1* | 9/2009 | Yoshida | G06F 9/485 718/102 |
| 2010/0262975 A1 | 10/2010 | Reysa et al. | |
| 2011/0154349 A1* | 6/2011 | Walton | G06F 9/5061 718/104 |
| 2014/0122143 A1 | 5/2014 | Fletcher et al. | |
| 2014/0229221 A1* | 8/2014 | Shih | G06Q 10/06312 705/7.23 |
| 2015/0113540 A1* | 4/2015 | Rabinovici | G06F 9/5011 718/104 |
| 2016/0328275 A1 | 11/2016 | Boenisch et al. | |
| 2021/0089534 A1* | 3/2021 | Joshi | G06F 16/24542 |

OTHER PUBLICATIONS

Kingston, "Parent-Child Task Relationships", ServiceNow, docs.servicenow.com/bundle/kingston-it-business-management/page/product/project-management/concept/c_Parent-ChildTaskRelationships.html, 2018, p. 1.

Suigh, "Parent-Child Workload: Advantage IBM Spectrum Symphony", IBM Spectrum Symphony Blog, Oct. 24, 2017, pp. 1-4.

* cited by examiner

RESOURCE MANAGEMENT FOR PARENT CHILD WORKLOAD

FIELD

The subject matter disclosed herein relates to resource management and more particularly relates to resource management for parent child workloads.

BACKGROUND

Parent processes frequently spawn child processes.

BRIEF SUMMARY

An apparatus for resource management for a parent child workload is disclosed. The apparatus includes a processor and a computer-readable storage media storing code executable by the processor. The processor organizes a plurality of processes into a plurality of process groups. Each process group includes a given parent process and all child processes of the given parent process. Each process group has a process level. The processor further calculates a process cost for each process group and assigns a process priority to each process group based on the process cost for the process group. The processor iteratively assigns computing resources to subgroups of a given process group with a highest process priority at a given process level. A method and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
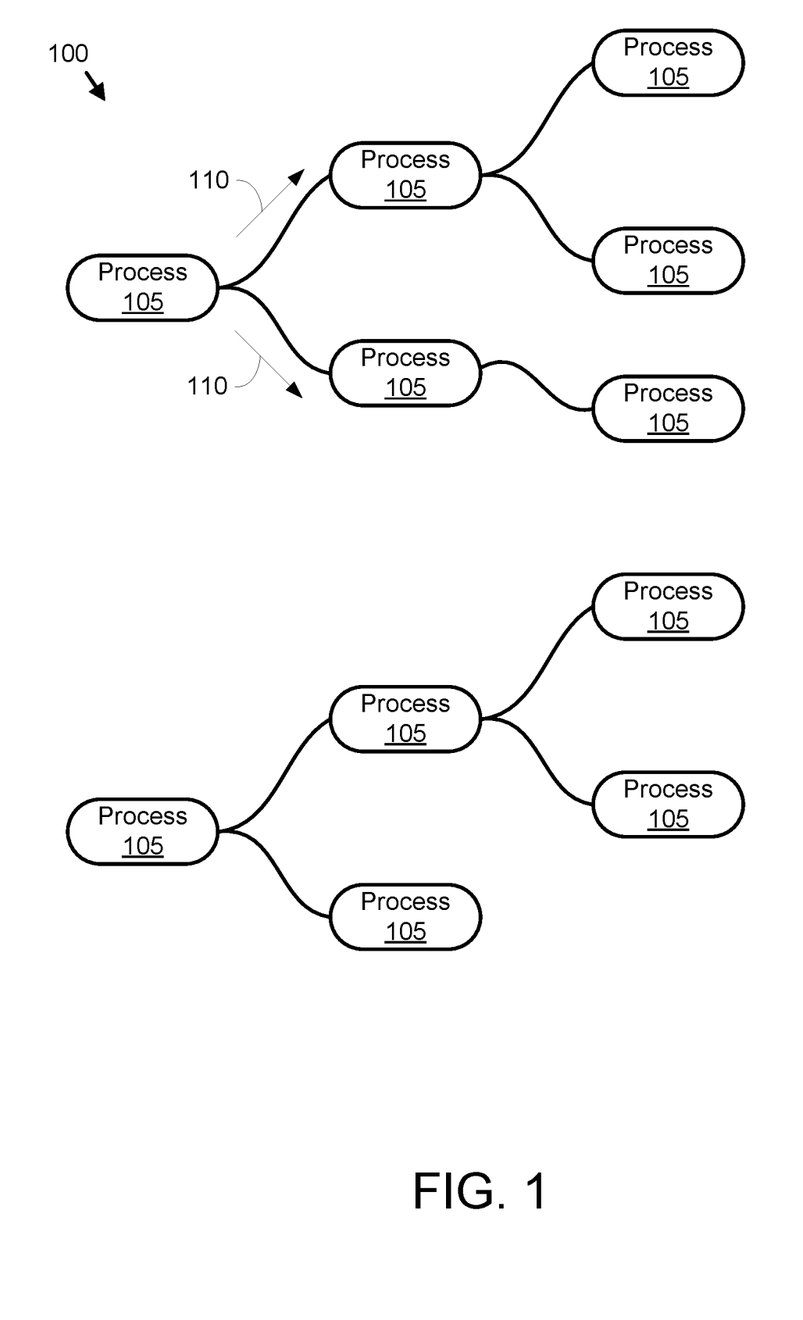
FIG. 1 is a schematic diagram illustrating one embodiment of a workload.

FIG. 1 is a schematic diagram illustrating one embodiment of a workload 100. The workload 100 is executed on computing resources such as one or more computers, processors, and the like. The workload 100 includes a plurality of processes 105. In one embodiment, a given process 105 spawns 110 one or more additional processes 105. Any process 105 that spawns 110 an additional process 105 is a parent process 105. In addition, any process 105 that that is spawned 110 by a parent process 105 is a child process 105. A given process 105 may be a parent process 105 of one or more child processes 105. In addition, the same given process 105 may be a child process 105 of another process 105.

The spawning 110 of child processes allows additional computing resources to be applied in parallel to a computation such as risk analysis or a prediction. In one embodiment, a parent process 105 that performs a calculation spawns 110 one or more child processes 105. Each child process 105 can be assigned computing resources. As a result, the computing resources assigned to the calculation is increased, speeding the completion of the calculation.

The parent process 105 often proceeds to a point in the calculation where the parent process 105 waits for the results of the child processes 105. Upon receiving the calculation results of the child processes 105, the parent process 105 may then proceed to completion.

Unfortunately, the processes 105 may spawn 110 enough child processes 105 that available computing resources are all assigned to processes 105. As a result, when a given process 105 spawns 110 a new child process 105, the given process 105 must often wait for a long period of time until computing resources become available for the new child process 105. While the given process 105 is waiting, parent processes 105 of the given process 105 are also waiting for the results of the given process 105. Often, much of the available computing resources are assigned to parent processes 105 that are doing little more than waiting for the completion of child processes 105. As a result, the computing resources are poorly allocated, resulting in increased execution times for the workload 100.

The embodiments described herein manage the computing resources by organizing the plurality of processes 105 into a plurality of process groups and calculating a process cost for each process group. The embodiments further assign a process priority to each process group based on the process cost for the process group. The embodiments iteratively assign computing resources to subgroups of a given process group with the highest process priority at a given process level to efficiently manage the computing resources as will be described hereafter.

Figure 2A:
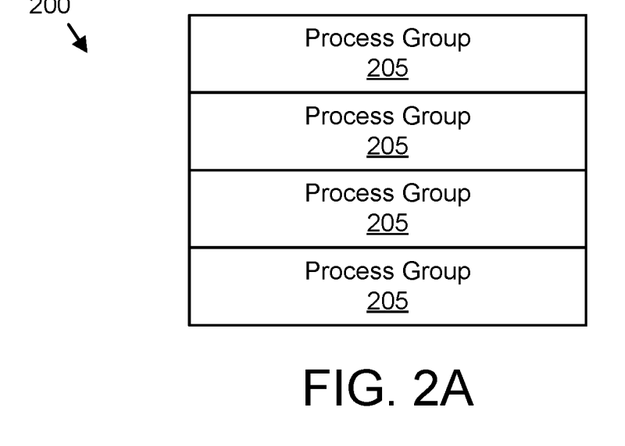
FIG. 2A is a schematic diagram illustrating one embodiment of process group data.

FIG. 2A is a schematic diagram illustrating one embodiment of process group data 200. In one embodiment, the process group data 200 is organized as a data structure in a memory. The process group data 200 includes a plurality of process groups 205. The process groups 205 are described in more detail in FIG. 2B and in FIG. 3.

Figure 2B:
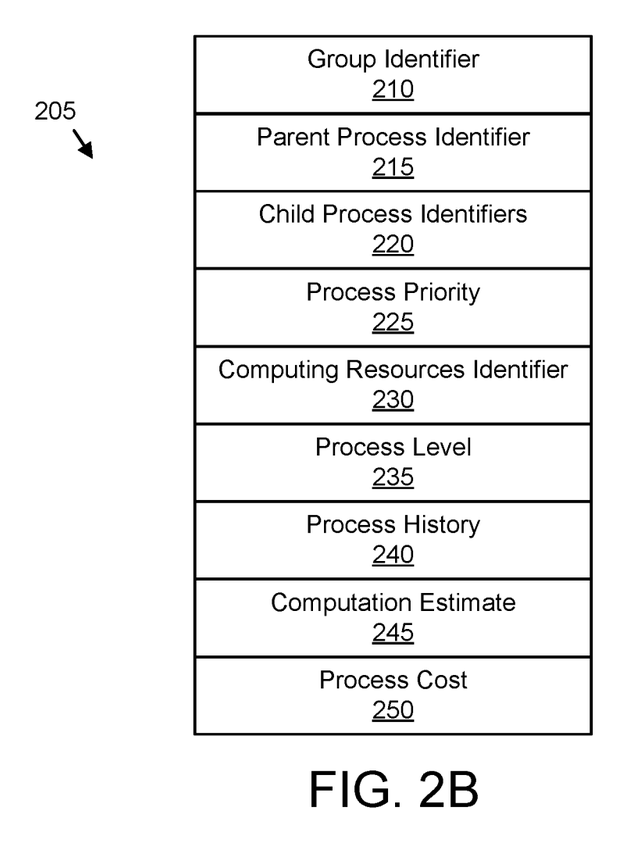
FIG. 2B is a schematic diagram illustrating one embodiment of a process group.

FIG. 2B is a schematic diagram illustrating one embodiment of a process group 205. In one embodiment, the process group 205 is organized as a data structure in a memory. In the depicted embodiment, the process group 205 includes a group identifier 210, a parent process identifier 215, child process identifiers 220, a process priority 225, a computing resources identifier 230, a process level 235, a process history 240, a computation estimate 245, and a process cost 250.

The group identifier 210 may uniquely identify the process group 205. The parent process identifier 215 identifies the parent process 105 of the process group 205. The process group 205 has one parent process 105. The child process identifiers 220 identify each child process 105 of the parent process 105.

In one embodiment, the process priority 225 is assigned to the process group 205 based on the process cost 250 for the process group 205. In a certain embodiment, the process priority 225 is a function of the process cost 250. In an alternate embodiment, the process priority 225 is an inverse function of the process cost 250. In a particular embodiment, the process priority PP 225 is calculated using Equation 1, where PC is the process cost 250.

$$PP = \text{rank}(PC) \qquad \text{Equation 1}$$

In one embodiment, the computing resources identifier 230 identifies the computing resources assigned to the process group 205. The process level 235 specifies a level of the parent process 105 and/or the process group 205 in a hierarchy of processes 105. The process level 235 is described in more detail in FIG. 3.

The process history 240 records historical run times for the process group 205. In one embodiment, the process history 240 records a percentage of instances that the process group 205 was on the critical path to completing all processes 105. The computation estimate 245 estimates a number of calculations required to complete the process group 205. In a particular embodiment, the computation estimate 245 includes an execution child task count that estimates the number of child tasks that must be executed to complete the process group 205.

The process cost 250 estimates the computational resources required to complete the process group 205. In one embodiment, the process cost 250 is based on the run time for the process group 205. In a certain embodiment, the run time for the process group 205 is calculated from one or more of the process history 240 and the computation estimate 245. In a particular embodiment, the process cost 250 is based on the run time for the process group 205 and on the execution child task count from the computation estimate 245.

In one embodiment, the process cost 250 is calculated to prioritize finishing process groups 205. For example, the process cost 250 may be calculated to approximate the computing resources required to finish the corresponding process group 205.

In one embodiment, the process history 240, computation estimate 245, and/or process cost 250 include and/or are calculated from the process history's 240, the computation estimates 245, and the process cost 250 of the process groups 205 of child processes 105 and/or from the child processes 105.

Figure 3:
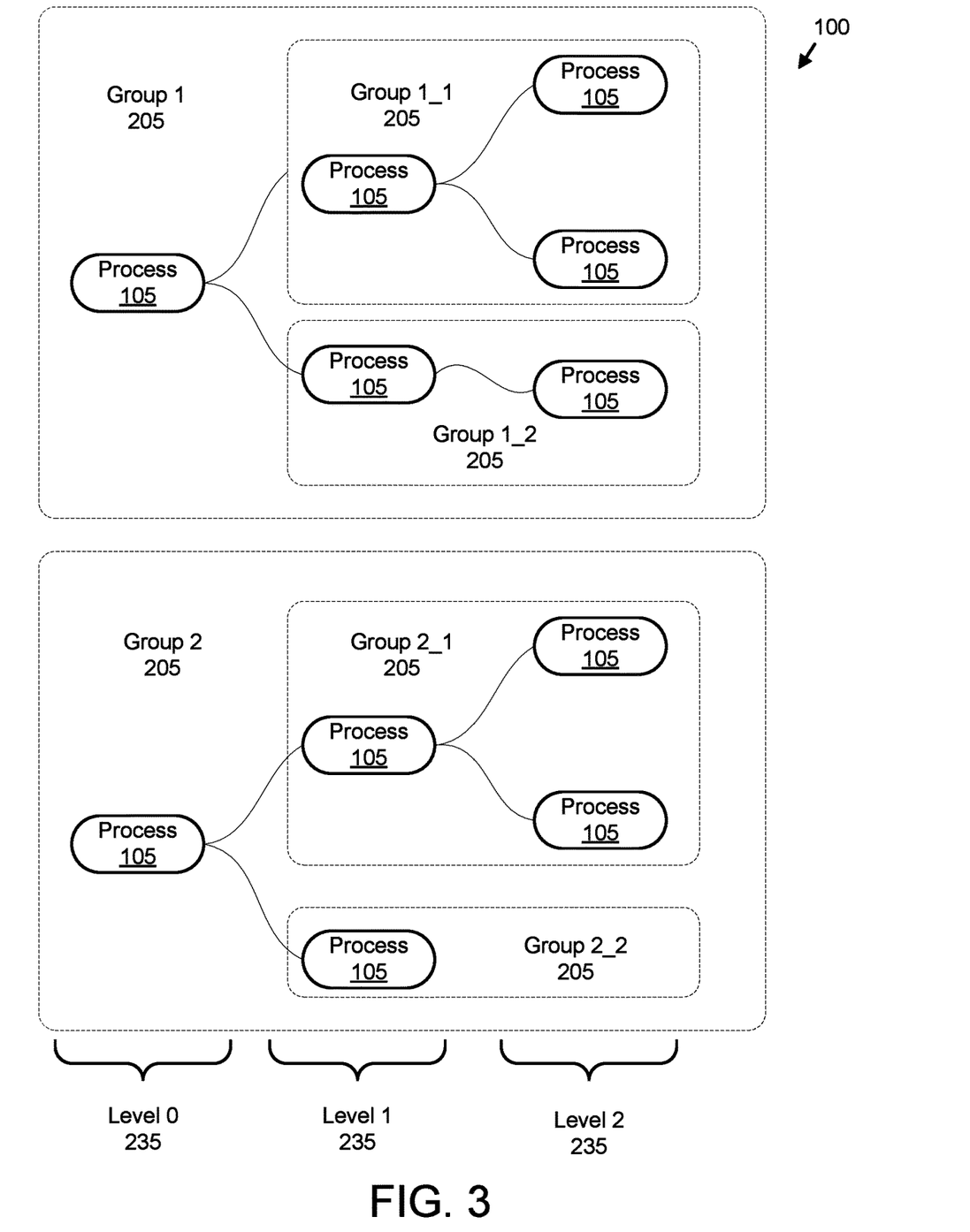
FIG. 3 is a schematic diagram illustrating one embodiment of a workload divided into process groups.

FIG. 3 is a schematic diagram illustrating one embodiment of a workload 100 divided into process groups 205. In one embodiment, each process group 205 comprises a given parent process 105 and all child processes 105 of the given parent process 105. In addition, each process group 205 has a process level 235. The process level 235 may correspond to a level of the parent process 105 in the hierarchy of processes 105 for the workload 100. As used herein, a subgroup refers to a process group 205 with a parent process 105 that is a child process 105 of a given process group 205.

In the depicted embodiment, a process group 205 is formed for each parent process 105. In addition, a process 105 may be in one or more process groups 205.

Figure 4A:
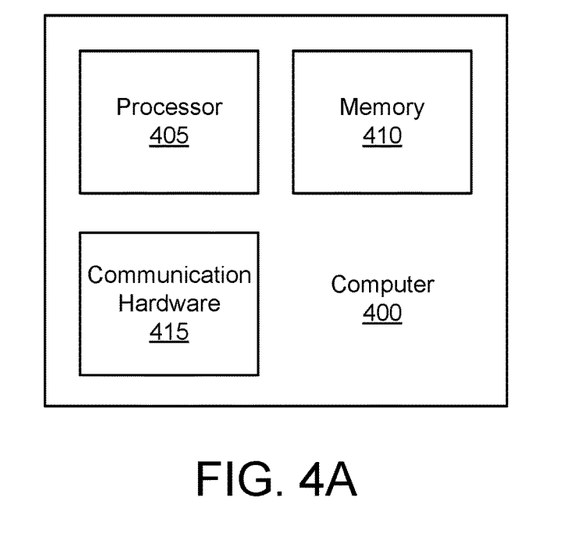
FIG. 4A is a schematic block diagram illustrating one embodiment of a computer.

FIG. 4A is a schematic block diagram illustrating one embodiment of a computer 400. In the depicted embodiment, the computer 400 includes a processor 405, a memory 410, and communication hardware 415. The memory 410 stores code. The memory 410 comprises one or more of a semiconductor storage device, a hard disk drive, an optical storage device, a micromechanical storage device, or combinations thereof. The processor 405 executes the code. The communication hardware 415 communicates with other devices such as other computers 400.

Figure 4B:
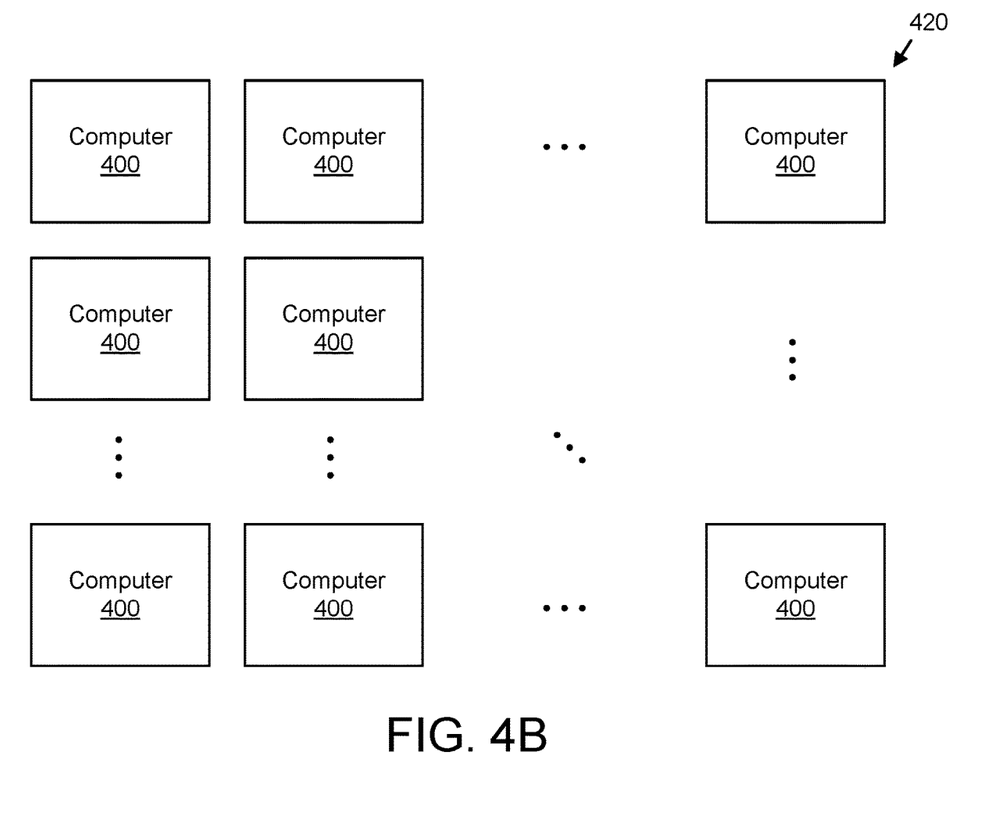
FIG. 4B is a schematic block diagram illustrating one embodiment of a computing resources.

FIG. 4B is a schematic block diagram illustrating one embodiment of a computing resources 420. In the depicted embodiment, the computing resources 420 include a plurality of computers. Each computer 400 is one of a stand-alone computer, a virtual computer, a server, a server blade, a core within a processor, or the like. In one embodiment, one or more computers 400 are assigned to a process 105.

Figure 5A:
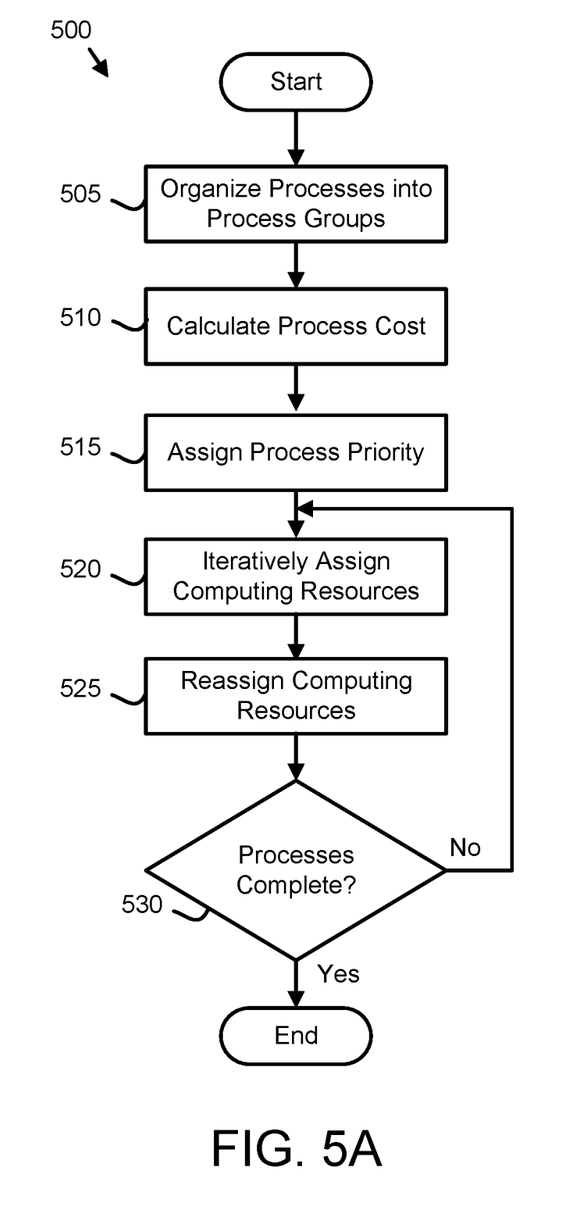
FIG. 5A is a schematic flow chart diagram illustrating one embodiment of a resource management method.

FIG. 5A is a schematic flow chart diagram illustrating one embodiment of a resource management method 500. The method 500 manages the computing resources 420 for the workload 100. The method 500 is performed by one or more processors 405 of the computing resources 420.

The method 500 starts, and in one embodiment, the processor 405 organizes 505 the plurality of processes 105 into process groups 205. In a certain embodiment, a process group 205 is organized for each parent process 105. All child processes 105 of the parent process 105 are included in the process group 205 including both immediate child processes 105, and the child processes 105 of other child processes 105 in the process group 205. In a certain embodiment, the level 235 is identified for the process group 205. In a particular embodiment, the level 235 is a number of parent processes 105 above the process group 205 in the process hierarchy.

In a certain embodiment, the processor 405 records the parent process identifier 215 and the child process identifiers 220 for the process group 205. In a particular embodiment, the child process identifiers 220 are recorded for immediate child processes 105. In an alternate embodiment, the child process identifiers 220 are recorded for all child processes 105 of the process group 205.

In one embodiment, the processor 405 calculates 510 the process cost 250 for each process group 205. The process cost 250 prioritizes finishing process groups 205. In a certain embodiment, the processor 405 determines the process history 240 and/or the computation estimate 245 for the process group 205. In a particular embodiment, the processor 405 queries the child processes 105 for the process history 240 and/or the computation estimate 245 of the child processes 105. In a certain embodiment, the processor 405 queries the child processes 105 for process cost 250.

In one embodiment, the process cost PC 250 is calculated using Equation 2, where RT is the run time from the process history 240 and k is a nonzero constant.

$$PC = kRT \qquad \text{Equation 2}$$

In a certain embodiment, the process cost PC 250 is calculated using Equation 3, where i is a runtime instance.

$$PC = \Sigma RT(i)/i \qquad \text{Equation 3}$$

In a particular embodiment, the process cost PC 250 is calculated using Equation 4, where CE is the computation estimate 245.

$$PC = kCE \qquad \text{Equation 4}$$

In one embodiment, the process cost PC 250 is calculated using Equation 5, where TC is the execution child task count.

$$PC = k\sqrt{RT*TC} \qquad \text{Equation 5}$$

In one embodiment, the processor 405 assigns 515 the process priority 225 to each process group 205 based on the process cost 250 for the process group 205. In a certain embodiment, the process priority 225 is a rank of the process cost 250 as shown in Equation 1. For example, the process group 205 with the highest process cost 250 may be assigned the highest process priority 225.

In one embodiment, the processor 405 iteratively assigns 520 computing resources 420 to subgroups of a given process group 205 with a highest process priority 225 at a given process level 235. The iterative assignment of computing resources 420 is described in more detail in FIG. 5B.

In a certain embodiment, the processor 405 reassigns 525 computing resources 420. In a particular embodiment, the computing resources 420 are reassigned 525 in response to a shortage of computing resources 420 for assignment to subgroups of the given process group 205 with the highest process priority 225 at the given process level 235. In a certain embodiment, the computing resources 420 are reassigned 525 in response to available computing resources 420 dropping below a resources threshold. The reassignment 525 of computing resources 420 is described in more detail in FIG. 5C.

In one embodiment, the processor 405 determines 530 if all processes 105 have completed. If all processes 105 have completed, the method 500 ends. If all processes 105 have not completed, the processor 405 loops to continue iteratively assigning 520 computing resources 420.

Figure 5B:
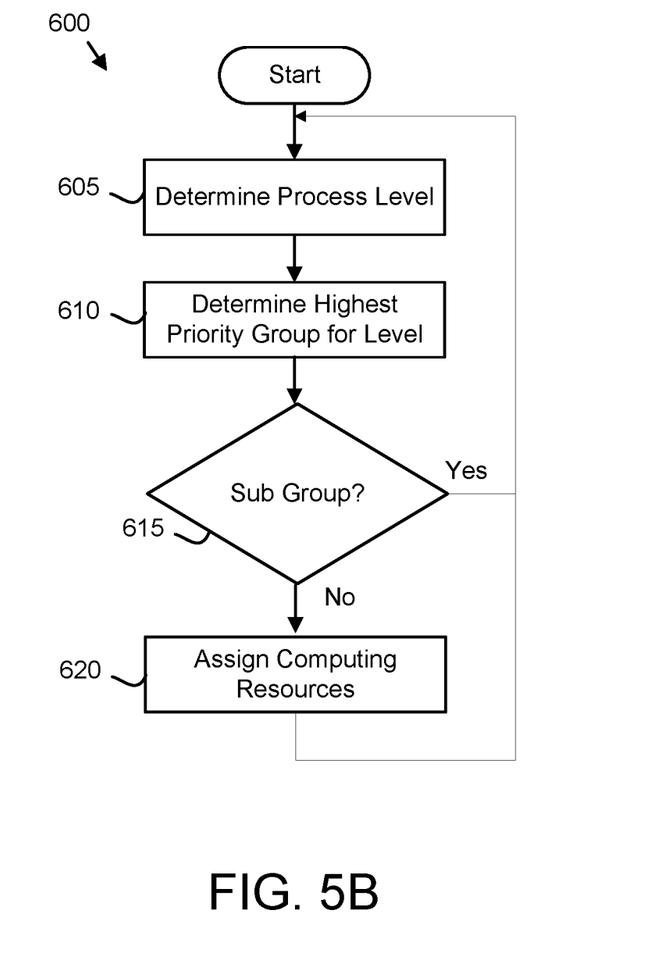
FIG. 5B is a schematic flow chart diagram illustrating one embodiment of a computing resources assignment method.

FIG. 5B is a schematic flow chart diagram illustrating one embodiment of a computing resources assignment method 600. The method 600 assigns computing resources 420 to processes 105. In one embodiment, the method 600 performs step 520 of FIG. 5A. The method 600 is performed by one or more processors 405 of the computing resources 420.

The method 600 starts, and in one embodiment, the processor 405 determines 605 the process level 235 of a given process 105. For example, the process level 235 may be level 0 235. In a certain embodiment, the processor 405 further determines 610 the process group 205 and/or process 105 at the process level 235 with the highest process priority 225. In a particular embodiment, the processor 405 further determines 610 the process group 205 and/or process 105 at the process level 235 with the highest process priority 225 and which no computing resources 420 have been assigned.

In one embodiment, the processor 405 determines 615 if the process group 205 and/or process 105 has a subgroup. If there is a subgroup, the processor 405 loops to determine 605 the process level 235 for the subgroup. If there is no subgroup, the processor 405 assigns 620 computing resources 420 to the process group 205 and/or process 105. For example, the processor 405 may assign 620 a computer 400 to the process group 205 and/or process 105. In a certain embodiment, the processor 405 assigns 620 computing resources to the process 105 and each child process 105 of the process 105. In addition, the processor 405 determines 605 a process level 235 above or less than the process level 235 or the process 105.

Figure 5C:
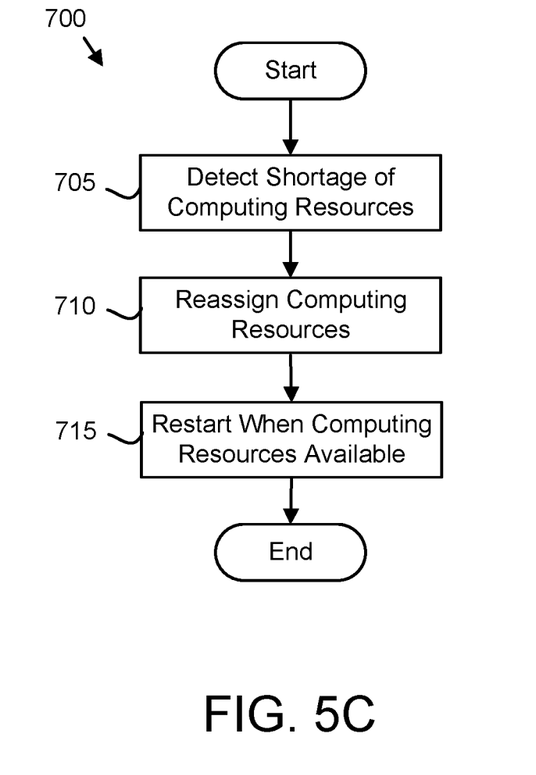
FIG. 5C is a schematic flow chart diagram illustrating one embodiment of a computing resources reassignment method.

FIG. 5C is a schematic flow chart diagram illustrating one embodiment of a computing resources reassignment method 700. The method 700 reassigns computing resources 420. In one embodiment, the method 700 performs step 525 of FIG. 5A. The method 700 is performed by one or more processors 405 of the computing resources 420.

The method 700 starts, and in one embodiment, the processor 405 detects 705 a shortage of computing resources 420. In a particular embodiment, the shortage is detected 705 if there are no computing resources 420 for assignment to the given process 105 with the highest process priority 225 at the given process level 235. In a certain embodiment, the shortage is detected 705 if there are no computing resources 420 for assignment to the given process 105 and child processes 105 of the given process 105 and/or to subgroups of the given process group 205 with the highest process priority 225 at the given process level 235.

In one embodiment, in response to detecting 705 the shortage of computing resources 420, the processor 405 reassigns 710 computing resources 420 from the lower process priority process group 205 to a higher process priority process group 205. In a certain embodiment, the processor 405 terminates the lower process priority process group 205 on the computing resources 420. In a particular embodiment, the processor 405 reassigns the freed computing resources to the higher process priority process group 205. For example, the processor 405 may terminate a first lower process priority process group 205 on a first computer 400 and reassigned the first computer 400 to a second higher process priority process group 205.

In a certain embodiment, the processor 405 restarts 715 the lower process priority process group 205 in response to computing resources 420 becoming available and the method 700 ends. For example, if computing resources 420 are available for a reassignment time interval, the processor 405 may automatically restart 715 the first lower process priority process group 205.

The embodiments organize processes 105 into process groups 205 and calculate a process cost 250 for each process group 205. The embodiments further assign a process priority 225 to each process group 205 based on the process cost 225 and iteratively assign computing resources 420 to subgroups of a given process group 205 with a highest process priority 225 at a given process level 235. As a result, processes critical to the completion of all processes 105 are assigned computing resources 420 early on, accelerating the completion of all processes 105.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for resource management for a parent child workload comprising:
   a processor;
   a computer-readable storage media storing code executable by the processor to:
   organize a plurality of processes into a plurality of process groups, wherein each process group comprises a given parent process and all child processes of the given parent process, and wherein each process group has a process level;
   calculate a process cost for each process group by querying each child process for a process history, determining a run time for each process history, and calculating the process cost as a product of the run time and a child task count, wherein the child task count estimates a number of child processes that are executed to complete the process group and the process cost approximates computing resources required to finish a process group;
   determine a process level for each process group, wherein a subprocess of a process group has a lower process level in a process hierarchy;
   assign a process priority to each process group based on computing resources required to finish the process group as a function of a rank of the process cost for the process group, wherein a process group with a highest process cost is assigned a highest process priority;
   iteratively assign computing resources to subgroups with lower process levels of a given process group with a highest process priority at the given process level;
   detect a shortage of computing resources for assignment to subgroups of the given process group with the highest process priority at the given process level;
   in response to detecting the shortage of computing resources, terminate a lower process priority process group;
   reassign freed computing resources to a higher process priority process group; and
   in response to the computing resources being available for a reassignment time interval, automatically restart the terminated lower process priority process group.

2. The apparatus of claim 1, wherein the process priority is an inverse function of the process cost.

3. The apparatus of claim 1, wherein the process cost is calculated as a product of a square root of the run time and the child task count.

4. A method for resource management for a parent child workload comprising:
   organizing, by use of a processor, a plurality of processes into a plurality of process groups, wherein each process group comprises a given parent process and all child processes of the given parent process, and wherein each process group has a process level;
   calculating a process cost for each process group by querying each child process for a process history, determining a run time for each process history, and calculating the process cost as a product of the run time and a child task count, wherein the child task count estimates a number of child processes that are executed to complete the process group and the process cost approximates computing resources required to finish a process group;
   determining a process level for each process group, wherein a subprocess of a process group has a lower process level in a process hierarchy;
   assigning a process priority to each process group based on computing resources required to finish the process group as a function of a rank of the process cost for the process group, wherein a process group with a highest process cost is assigned a highest process priority;
   iteratively assigning computing resources to subgroups with lower process levels of a given process group with the highest process priority at a given process level;
   detecting a shortage of computing resources for assignment to subgroups of the given process group with the highest process priority at the given process level;
   in response to detecting the shortage of computing resources, terminating a lower process priority process group;
   reassigning freed computing resources to a highest process priority process group; and
   in response to the computing resources being available for a reassignment time interval, automatically restarting the terminated lower process priority process group.

5. The method of claim 4, wherein the process priority is an inverse function of the process cost.

6. The method of claim 4, wherein the process cost is calculated as a product of a square root of the run time and the child task count.

7. A computer program product comprising a computer-readable storage medium having program instructions embodied therewith, the program instructions readable/executable by a processor to cause the processor to:

organize a plurality of processes into a plurality of process groups, wherein each process group comprises a given parent process and all child processes of the given parent process, and wherein each process group has a process level; calculate a process cost for each process group by querying each child process for a process history, determining a run time for each process history, and calculating the process cost as a product of the run time and a child task count, wherein the child task count estimates a number of child processes that are executed to complete the process group and the process cost approximates computing resources required to finish a process group;

determine a process level for each process group, wherein a subprocess of a process group has a lower process level in a process hierarchy;

assign a process priority to each process group based on computing resources required to finish the process group as a function of a rank of the process cost for the process group, wherein a process group with a highest process cost is assigned a highest process priority;

iteratively assign computing resources to subgroups with lower process levels of a given process group with a highest process priority at the given process level;

detect a shortage of computing resources for assignment to subgroups of the given process group with the highest process priority at the given process level;

in response to detecting the shortage of computing resources, terminate a lower process priority process group;

reassign freed computing resources to a higher process priory process group; and in response to the computing resources being available for a reassignment time interval, automatically restart the terminated lower process priority process group.

8. The computer program product of claim 7, wherein the process priority is an inverse function of the process cost.

9. The computer program product of claim 7, wherein the process cost is calculated as a product of a square root of the run time and the child task count.

* * * * *